United States Patent
Daigre

(10) Patent No.: US 7,743,893 B2
(45) Date of Patent: Jun. 29, 2010

(54) COMPACT INTEGRATED BRAKE SYSTEM

(75) Inventor: Richard Daigre, Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 364 days.

(21) Appl. No.: 11/125,397

(22) Filed: May 3, 2005

(65) Prior Publication Data

US 2006/0249338 A1  Nov. 9, 2006

(51) Int. Cl.
*F16D 65/24* (2006.01)

(52) U.S. Cl. ..................... 188/170; 188/71.5

(58) Field of Classification Search ........... 188/71.5, 188/71.6, 72.1–72.4; 192/85 AA, 86, 91 A
See application file for complete search history.

(56) References Cited

U.S. PATENT DOCUMENTS

| | | | |
|---|---|---|---|
| 2,381,393 A | 8/1945 | Brown | |
| 2,636,581 A * | 4/1953 | Bitler | 192/18 A |
| 3,752,267 A | 8/1973 | Dovell et al. | |
| 3,974,896 A * | 8/1976 | Rach | 188/170 |
| 4,616,520 A * | 10/1986 | Ehrlinger et al. | 74/325 |
| 4,667,527 A * | 5/1987 | Ehrlinger et al. | 74/411.5 |
| 6,253,882 B1 * | 7/2001 | White | 188/71.5 |
| 6,357,558 B1 * | 3/2002 | Case et al. | 188/71.5 |
| 6,412,613 B1 | 7/2002 | Lu | |
| 6,516,924 B1 | 2/2003 | Michael et al. | |
| 6,659,398 B2 | 12/2003 | Serven | |

OTHER PUBLICATIONS

International Search Report dated Aug. 11, 2004.
Page from a brochure; Types of Failsafe Brakes (no date).

\* cited by examiner

*Primary Examiner*—Christopher P Schwartz
(74) *Attorney, Agent, or Firm*—Rankin, Hill & Clark LLP

(57) ABSTRACT

A mechanically applied spring release brake (50) having a single small diameter dynamic seal (46) is integrated into a wheel and tire to provide for a small package utilized in forklifts, wheel trucks and other industrial vehicles.

24 Claims, 3 Drawing Sheets

US 7,743,893 B2

COMPACT INTEGRATED BRAKE SYSTEM

This application is a national filing of PCT Patent Application Ser. No. PCT/US2003/035081 filed on Nov. 4, 2003, which claimed the benefit of Provisional Patent Application No. 60/423,568 filed Nov. 4, 2002.

FIELD TO WHICH THE INVENTION RELATES

This invention relates to an integrated brake and wheel package.

BACKGROUND OF THE INVENTION

Brakes have been used for stopping the movement of rotary objects such as scissorlifts or tow motor wheels, chain lift pulleys and others. These brakes come with drums, disks, increasing ramps, and other type of energizing devices. Typically, these energizing devices are large (necessitating a sizable diameter package), or require a separate mounting adjacent to the effected rotary device (necessitating a longer package). An example of such energizing devices are the Ausco series of brakes as typified in both the radial and axial versions (the former being inside a separate wheel and the latter being displaced laterally off of the end of a separate wheel axle). Other applications use large diameter external brake disks or internal brake drums (as for example used in present day separate wheel rim automobiles). Attempts to integrate the brake and wheel frequently have resulted in large sized devices (R. W. Brown U.S. Pat. No. 2,381,393, for example) or have produced complex mechanisms (Lemaire U.S. Pat. No. 5,333,705, Hydraulic Motor and Brake, for example).

The cost, complexity and/or size of these units have not produced a suitable integration of wheel and brake.

SUMMARY OF THE INVENTION

It is an object of this invention to integrate a disk brake inside a supported rotary member.

It is an object of this invention to reduce the cost of providing a braked wheel.

It is another object of this invention to reduce the stress on a wheel system when a hydraulically released brake is actuated.

It is a further object of this invention to provide for a compact mechanical brake application.

It is another object of this invention to provide for a more adaptable wheel brake.

It is a further object of this invention to reduce the physical and hydraulic complexity of the device associated with a brake.

It is another object of this invention to provide for a high torque mechanical brake in a small diameter unit.

It is yet another object of this invention to reduce the number of dynamic seals on rotary members in a brake.

It is still a further object of this invention to increase the speed of, and to simplify, the manufacturing integration of a braking rotary component into an associated vehicle.

Other objects and a more complete understanding of the invention may be had by referring to the drawing in which:

DETAILED DESCRIPTION OF THE INVENTION

The invention of this application relates to a spindle mounted rotary member including an engagement mechanism.

The example brake assembly shown includes a braking mechanism 50 located between a spindle 20 and a tire 100.

Figure 1:
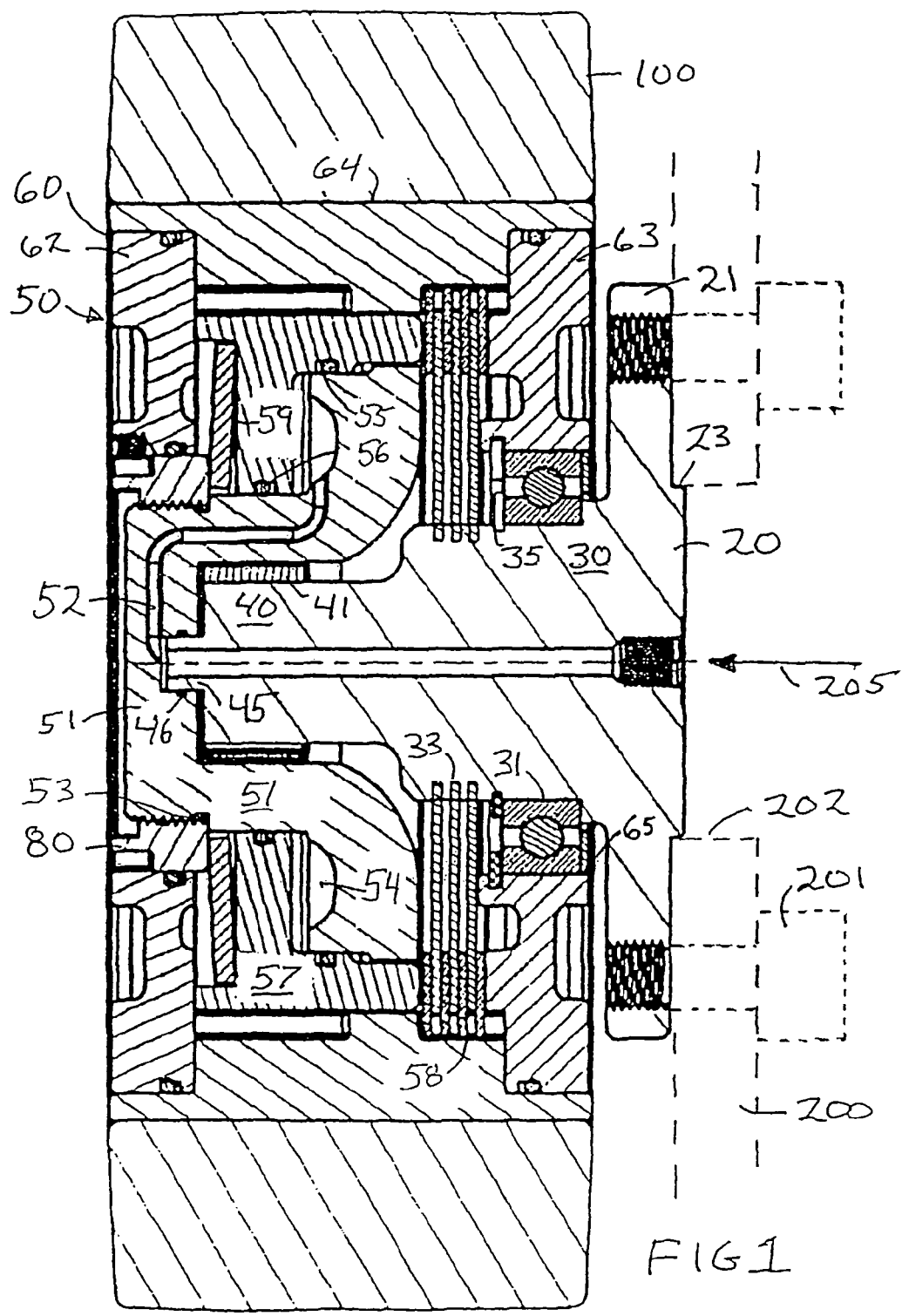
FIG. 1 is a lateral cross-sectional view of an integrated wheel/brake/spindle combination. This FIG was taken substantially along lines 1-1 in FIG. 3.
Figure 2:
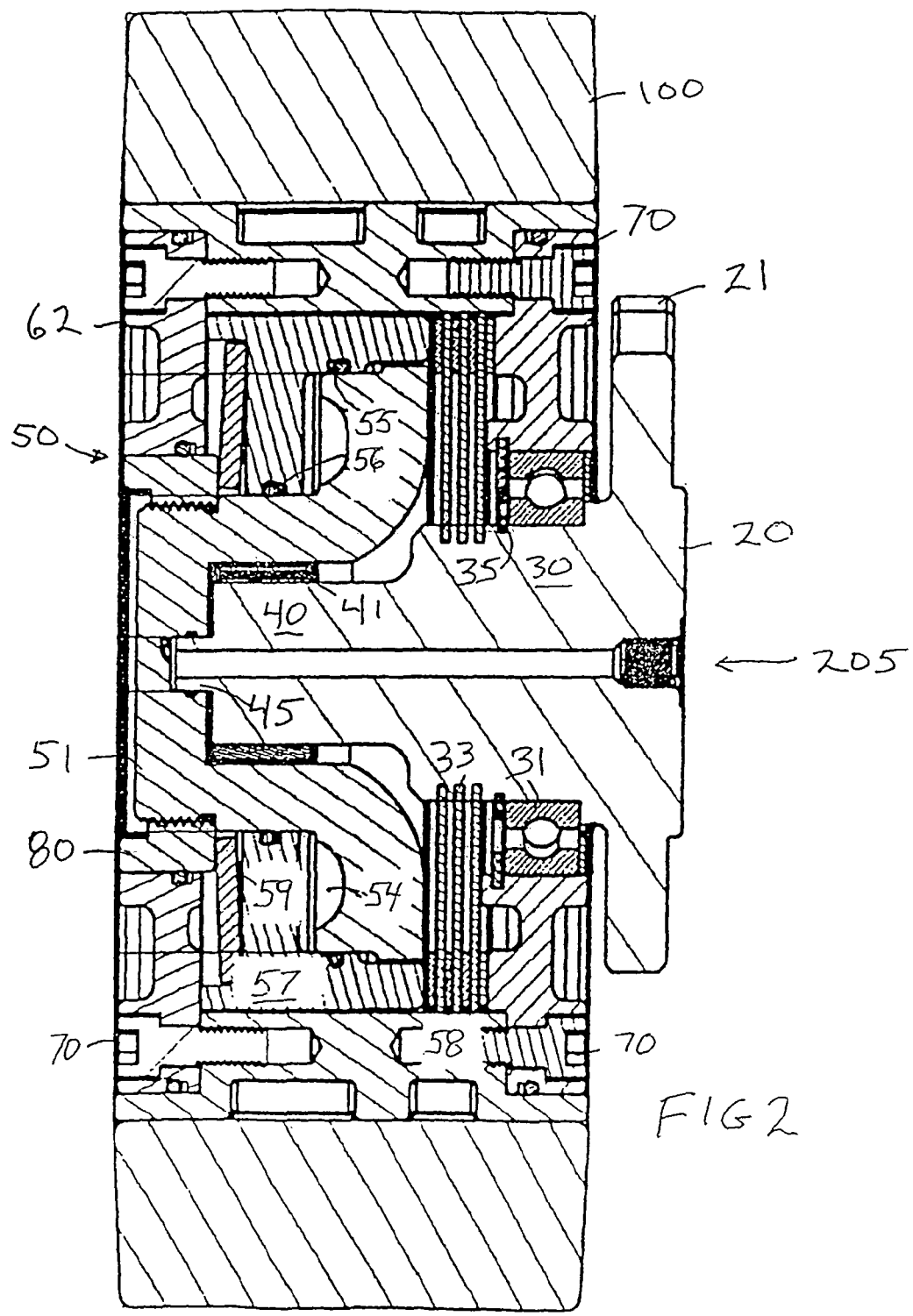
FIG. 2 is a further lateral cross-sectional view of the integrated wheel/brake/spindle of the present invention. This FIG was taken substantially along lines 2-2 in FIG. 3.
Figure 3:
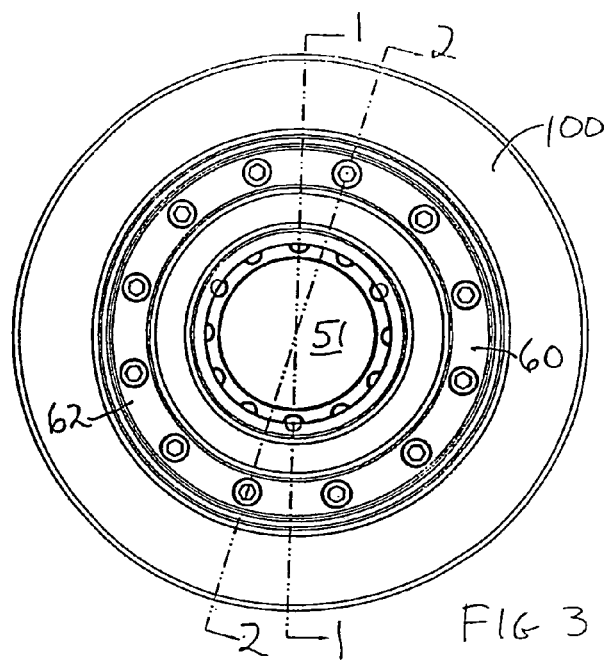
FIG. 3 is a view of the left hand side of the unit of FIG. 1.
Figure 6:
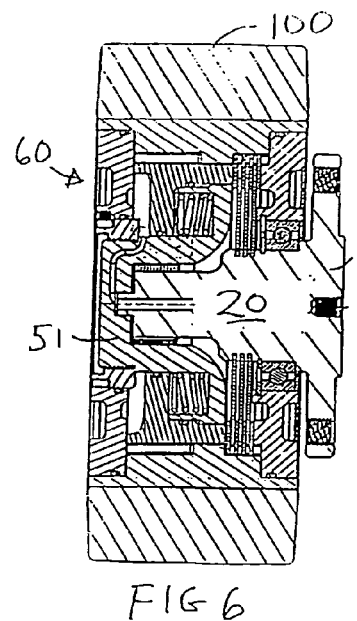
FIG. 6 is a hydraulically applied multiple coil spring released brake incorporating the invention.
Figure 4:
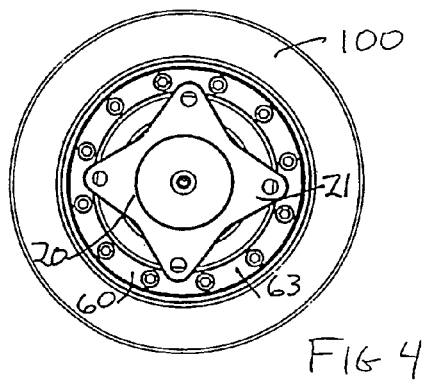
FIG. 4 is a view of the right hand side of the unit of FIG. 1.
Figure 5:
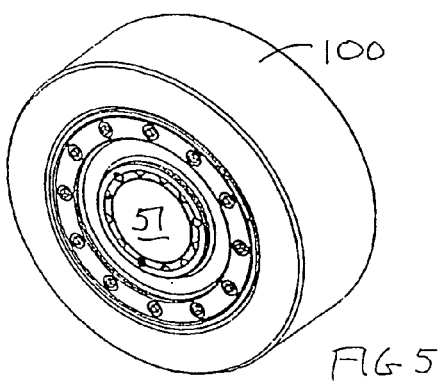
FIG. 5 is a perspective view of the completed unit of FIG. 1.

The spindle 20 serves to rotatively mount the tire 100 and contained braking mechanism 50 to an associated part. An example of this associated part would be the vehicle frame of a scissorlift. The particular embodiment would be bolted onto such frame (shown in dotted lines 200 in FIG. 1) from the backside by bolts 201. This would tightly retain the mounting plate 21 of the spindle to the frame 200 against the weight and dynamic loading to and from the vehicle or device (such as a scissorlift) and the tire 100. Note that the particular mechanism 10 disclosed is spring applied and pressure released braking mechanism. Therefore, a hole 202 would be provided in the frame in order to allow a suitable selective pressurization hydraulic line 205 to be interconnected to the brake assembly 10. (This hole 202 also aids in localizing and weight transfer between the spindle and the frame 200 due to flange 23 engaging the sides of the hole 202.)

In addition to the mounting plate 21, the spindle 20 has an enlarged primary bearing area 30, a relatively reduced secondary bearing area 40 and a reduced oil passage extension 45.

The enlarged main bearing section 30 serves to carry the primary weight of the vehicle by forming the primary interconnection for the main bearing 31 and the primary torque by the attachment of the reaction disks 33 thereto. It is preferred that the main weight loading of the wheel be through this ball bearing (being of large size and of proximity to the enlarged diameter plate 21 and frame, it can dissipate heat more efficiently). In addition, the preferred main bearing 31 as shown is a ball bearing located between the spindle mounting plate 21 and two separate snap rings 35. One snap ring is internal to the spindle 20 and the other is external to plate 63. Plate 63 has a small inner lip 65 adjacent to the outer inside edge of bearing 31. This allows the bearing at this location to take the forces inwardly and outwardly between the wheel 100 to the frame 200 (i.e., separate thrust bearings are not necessary).

The secondary bearing area 40 aids in the support of the weight loading of the wheel. Incorporating a needle bearing 41 at this location also allows room and physical placement for the parts of the braking mechanism 50 radially outward therefrom. This lowers the necessary diameter of the housing 60 in respect to alternative bearings. It also allows the bearing outward of most of the braking mechanism 50, thus aiding in reducing wobble and in localizing the later described dynamic seal 46.

Located off the end of the secondary bearing area 40 is a reduced oil passage extension 45. This reduced oil passage section is surrounded by the main dynamic seal 46 for the actuation mechanism. By being reduced in diameter, this has the effect of reducing the axial thrust of the "piston area" between the braking mechanism 50 and the spindle 20 during pressurization from line 205 (compare the area of the reduced oil passage extension 45 which would be necessary if a dynamic high pressure seal was located about the larger diameter 30 of the spindle with that of the main bearing 30, for example). This reduces any axial shifting of the wheel 100 in respect to the spindle 20 upon the pressurization of the brake assembly 50. This lengthens the service life of the package.

This dynamic seal 46 is also the only high pressure seal in the entire device which will routinely be subject to rotary movement between adjoining parts (all of the other parts of the brake assembly 10 are either located between two relatively immovable parts—the unitary housing 60 for example—or are located between a part which will be subject to rotative forces only during engagement and disengagement—the piston 57 for example. This design minimizes the necessity of complex manufacturing processes on adjoining parts (for example grinding) while also lowering the cost of parts (larger diameters of seals are of significant cost).

The brake mechanism 50 sits surrounding the spindle so as to mechanically rotatively interconnect the tire 100 to the spindle 20 as well as providing for a compact engagement mechanism.

The particular braking mechanism 50 includes a reaction support member 51, a housing 60, and a spinner nut locking member 80.

The reaction support member 51 serves to interconnect the housing 60 with the outer needle bearing 41 thus to pass any radial forces therebetween. In addition the reaction support member 51 has an oil passage 52 which extends from the reduced oil passage extension 45 to the main activation cavity 54 adjacent piston 57. As the activation cavity 54 is located between first and second piston seals 55, 56 the pressurization of the passage 26 in the spindle will cause movement of the piston 57 against the force of the disk spring 59 so as to deactivate the braking engagement mechanism. Upon the cessation of pressurization of the passage in the spindle, the piston 57 will move the other way due to the force of the disk spring 59, this in turn will engage the braking plates 58 which are connected to the housing 60 with reaction plates 33 which are interconnected to the spindle 20, thus to apply a braking action for the device.

Note that the areas of piston seals 55, 56 are the only location where significant axial movement of two adjoining parts is maintained. As the swept area in the preferred device has both locations on the outer circumferential of a single part, manufacturing can occur at a single grinding location. This reduces the cost of the device. (Since the piston seals 55, 56 are reset into grooves in the piston 57, the piston can be turned.) Note also that it is possible to assemble the piston 57 and reaction support member 51 together for later incorporation as an integral unit into the remainder of the device 10. This allows the premanufacture of this unit in one location (preferably along with seal 46) with integration to the remainder of the device occurring in another less precise location; all important seals 65, 66 (and 46) are physically protected. The locations can be very remote or even across the country from each other. This is aided by the fact that except for these parts the other dimension that should be held is the outer surface of the reduced oil passage section 45 of the spindle 20.

The spinner nut locking member 80 serves a dual purpose of assisting in the weight loading from the wheel 100 and the housing 60 to the exterior surface of the reaction support member 51 (which then passes along to the spindle 20 through bearing 41). The spinner member 80 thus functions as an integral weight transfer process. The spinner member 80 in addition also axially pressure preloads the inner edge of the disk spring 59. This provides the engagement forces for the braking mechanism 50. Note that it is preferred that the spinner nut 80 in contact with the adjacent shoulder 53 of the reaction member 51 to provide for a reliable braking force across individual units within any series of devices 10. Note that it is preferred to assemble the entire device before adding the spinner nut. Assembly can thus occur with hand tools without regard for the loading of the spring 59. The spinner nut can then be included with a spanner wrench. (The screw threads outside the nut would provide the leverage to compress the spring 59.)

The housing 60 serves to contain the spindle 20 and braking mechanism 50 in addition to providing an integral weight transferring hub for the tire 100.

In respect to containing the braking mechanism 50, the wheel 100 is substantially the same inner and outer diameter and width as it would be without such mechanism. This allows a given manufacturer to produce both braked and unbraked designs with a single frame. This would include other parts associated with the frame as the main addition to unbraked units is the addition of pressure line 205.

In respect to the transfer of weight, the housing 60 shown is primarily made of two cylindrical plates 62, 63 and a surrounding hub 64. In the embodiment shown, all of these pieces are integrally interconnected together via a series of hex screw bolts 70 that extend circumferentially about the device from both ends.

The inner cylindrical plate 63 of the housing is interconnected to the spindle 20 directly through the main bearing 31. The fact that all pieces are radially aligned facilitates the weight transfer between the parts, enabling them to function as a single unitary piece. Due to this bearing and the existence of snap rings 35 (one internal, one external), this cylindrical plate 63 of the housing is not able to shift axially of the device. As the other housing parts 62, 64 are integrally connected to this plate 63, the plate 63 thus serves as the primary retention mechanism between the spindle and the remainder of the brake assembly 50.

The outer cylindrical piece 63 passes its forces through the spinner nut locking member 80 which is itself securely interconnected through the reaction support member 51 to the inner bearing 41. This allows forces on the outer end of the assembly to pass through the needle bearing 41 into the secondary bearing area 40 of the fixed spindle 20.

The tire 100 completes the assembly 10. This tire 100 is directly interconnected to the housing 60 so that this housing serves as a hub for the tire. This allows the assembly 10 to have a smaller diameter and less complicated construction than with the alternative of a separate wheel hub.

Note that the load of the tire 100 surrounds the two bearings 31, 41. The radial transfer of forces between the two is thus readily accomplished. Further, since virtually all of the brake mechanism 50 rotates at the same time and at the same speed of the tire 100 there is no need for complicated fluid passages or seals: the dynamic seal 46 provides for substantially all of the rotational movement between adjoining parts in the device. The remaining seals are static seals (mostly relative to the housing 60, reaction support member 51), or subject to small movements under limited condition (the piston seals 55, 56 during a transition between the two operating states of the brake—on or off).

The particular preferred embodiment has a tire 100 substantially 12" in diameter and 4.3" in width. The total unit is 5" wide including spindle plate 21. The tire has a depth of 1+¾" to the outer diameter of the housing 60. The support piston 57 has a hydraulic cavity 54 with an outer diameter of 5+⅜" and an inner diameter of 3+⅛". The reduced oil passage extension 45 of the piston has a diameter of 0.5". The disk spring 59 is 6" in diameter with an initial depth of 0.38". It develops substantially 500000 pounds of force at 0.09" deflection.

The preferred embodiment of the invention discloses a method of manufacture including preassembly of the reaction member and piston, the loading of the spring by the spindle nut, the multi-piece housing, and the modifications of the spindle mounting plate to accomplish differing frames. The use of a novel seals (only three seals between moveable parts) and the reduced sized oil passage extension simplify and lengthen the service life of the assembly. The availability of room about the outer end of the spindle for the brake and the use of the intermediate reaction support member shorten the unit to substantially the width of the surrounding tire. The oil passage is simple through the spindle, with a double back path to the brake piston cavity. The total unit can be used without the brake package without structural modification. A single ball bearing serves as a main bearing as well as the thrust bearings. It is further possible to remanufacture the device from one end.

Note that due to the simplicity of the structure of the brake assembly, alternate applications can be readily handled by a single design. For example, the spindle mounting plate 20 serves to integrate the brake assembly 10 with its associated device. It is a fairly easy matter to design and make differing spindle mounting plate 21 to provide for a wide number of differing applications with a basic single device. Further, maintenance of the device is facilitated: by removing the spinner nut locking member 80 and the outer hex screw bolts 70 it is possible to entirely disassemble the braking mechanism to replace any pressure components or disk components therein without significant compromise to the overall structural strength of the device once reassembled. Additional example, the moving parts of the brake (disks 33, 58; piston 57; disk spring 59; and, seal 46) can be entirely omitted without structural compromise to the tire/spindle weight supportive rotary interconnection. Therefore, although the invention has been described in its preferred form with a certain degree of particularity, it is to be understood that modifications can also be made without deviating from the invention as hereinafter claimed.

What is claimed is:

1. A brake assembly for a wheel of an associated vehicle having a frame, said assembly comprising:
    a spindle, said spindle having a flange located at a first end section, said flange of said spindle non-rotatably connected to the frame of the associated vehicle,
    a housing, said housing being a multi-part construction with at least one part being removable without compromising the connection of a first bearing to at least one of said first end section of said spindle and said housing, said housing surrounding said spindle, the wheel being mounted to an outer surface of said housing,
    said first bearing surrounding said spindle neighboring said flange extending between said spindle and said housing, said first bearing axially locating the housing in respect to the spindle,
    means to connect said first bearing to said spindle preventing axial movement therebetween,
    means to connect said first bearing to said housing preventing axial movement therebetween,
    a second bearing, said second bearing extending between a second end section of said spindle and said housing radially within the confines of a brake operating system,
    brake disks, said brake disks extending between said spindle and said housing on the opposite side of said first bearing from said flange,
    said brake operating system being located in said housing on the opposite side of said brake disks from said first bearing,
    said brake operating system including a pressure line, said pressure line extending in said spindle to said second end section,
    said second end section of said spindle having a reduced diameter in respect to the remainder of said spindle,
    a dynamic seal, said dynamic seal extending between said reduced diameter second end section of said spindle and said housing allowing for a high pressure dynamic seal upon the rotation of said housing in respect to said fixed spindle,
    and means to selectively operate said brake operating system.

2. The brake assembly of claim 1 characterized in that said dynamic seal is radially outwards of said reduced diameter of said spindle.

3. The brake assembly of claim 1 characterized by said second bearing extending between said spindle and said housing between said dynamic seal and said brake disks.

4. The brake assembly of claim 1 characterized in that said brake operating system is radially outwards of said second bearing.

5. The brake system of claim 1 characterized by said brake operating system includes a biasing spring, and the connection of said one part to said housing engaging said biasing spring in respect to said housing.

6. The brake system of claim 1 characterized in that said flange of said spindle extends in a hole in the frame, and said hole in the frame partially surrounding said flange.

7. The brake system of claim 1 characterized in that said brake operating system includes a piston, said piston being in said housing radially outwards of said spindle between said outer end and said brake disks.

8. The brake assembly of claim 1 characterized in that substantially all of said brake operating system can be removed without
    compromising the connection between said housing and said spindle through said first bearing.

9. The brake assembly of claim 1 characterized in that the brake assembly is internal of the wheel.

10. A hydraulic brake for an associated vehicle having a frame, the brake comprising:
    a spindle including a flange configured to attach to a frame of an associated vehicle in a manner such that the spindle does not rotate with respect to the frame, the spindle including a passage;
    a housing at least partially surrounding the spindle and being connected to the spindle such that the housing rotates around the spindle;
    a sealed activation cavity disposed in the housing and in communication with the passage;
    a brake plate connected to the housing;
    a reaction plate connected to the spindle;
    a piston disposed in the housing, the piston being moveable away from at least one of the brake plate and the reaction plate upon pressurization of the activation cavity.

11. The brake of claim 10, wherein the housing is configured such that an associated tire mounts to an outer radial surface of the housing.

12. The brake of claim 11, further comprising a bearing contacting the spindle and the housing and a snap ring, the bearing being disposed between a snap ring and the flange.

13. The brake of claim 12, wherein the snap ring comprises a first snap ring attached to the spindle and a second snap ring attached to the housing.

14. The brake of claim 10, wherein the spindle includes an outer end disposed away from the flange, the passage extending to the outer end.

15. The brake of claim 14, further comprising a seal contacting an outer surface of the outer end of the spindle and a component that rotates around the spindle.

16. The brake of claim 15, wherein a portion of the spindle adjacent the outer end has a reduced diameter as compared to the remainder of the spindle.

17. The brake of claim 16, further comprising a bearing contacting the spindle between the seal and the brake plate.

18. The brake of claim 10, further comprising a biasing member disposed in the housing and contacting the plunger for biasing the plunger toward at least one of the brake plate and the reaction plate.

19. The brake of claim 18, further comprising a threaded member connected to the housing for compressing the biasing member.

20. The brake of claim 10, wherein the piston rotates around the spindle.

21. The brake assembly of claim 10, wherein the housing is fixed with respect to the spindle so that the housing and wheel do not rotate around the spindle when the reaction plate engages the brake plate.

22. The brake assembly of claim 10, wherein the flange of the spindle includes a plurality of mounting apertures dimensioned to receive fasteners for mounting the spindle to the vehicle frame.

23. A brake assembly in combination with a vehicle, the vehicle including a frame and a wheel rotatable connected to the frame, the brake assembly comprising:

a spindle fixedly mounted to the vehicle frame such that the spindle does not rotate with respect to the frame, wherein the spindle includes a passage in communication with an activation cavity disposed in the housing, wherein the brake assembly is deactivated upon pressurization of the activation cavity a housing connected to the spindle for rotation about the spindle, the housing including a radial outer surface, the wheel being mounted around the radial outer surface of the housing, the brake assembly being internal of the wheel, wherein the housing is fixed with respect to the spindle so that the housing and wheel do not rotate around the spindle when the brake assembly is activated.

24. The brake assembly of claim 23, wherein the spindle includes means for mounting the spindle to the vehicle frame.

* * * * *